United States Patent
Gay et al.

(10) Patent No.: US 8,375,311 B2
(45) Date of Patent: Feb. 12, 2013

(54) SYSTEM AND METHOD FOR DETERMINING PLACEMENT OF A VIRTUAL OBJECT ACCORDING TO A REAL-TIME PERFORMANCE

(75) Inventors: Michael Gay, Collinsville, CT (US); Michael Zigmont, Kensington, CT (US); Robert Hess, Bristol, CT (US); Anthony Bailey, Wallingford, CT (US)

(73) Assignee: Disney Enterprises, Inc., Burbank, CA (US)

( * ) Notice: Subject to any disclaimer, the term of this patent is extended or adjusted under 35 U.S.C. 154(b) by 641 days.

(21) Appl. No.: 12/383,503

(22) Filed: Mar. 24, 2009

(65) Prior Publication Data
US 2010/0245349 A1 Sep. 30, 2010

(51) Int. Cl.
*G06F 3/048* (2006.01)
*G06T 15/00* (2011.01)

(52) U.S. Cl. ...................................... 715/757; 345/419
(58) Field of Classification Search ................ None
See application file for complete search history.

(56) References Cited

U.S. PATENT DOCUMENTS

| | | | |
|---|---|---|---|
| 5,577,188 A | 11/1996 | Zhu | |
| 5,982,352 A | 11/1999 | Pryor | |
| 6,624,853 B1 | 9/2003 | Latypov | |
| 7,043,695 B2 | 5/2006 | Elber | |
| 2002/0186221 A1 | 12/2002 | Bell | |
| 2002/0190923 A1* | 12/2002 | Ronzani et al. | 345/50 |
| 2004/0046744 A1* | 3/2004 | Rafii et al. | 345/168 |
| 2005/0245302 A1 | 11/2005 | Bathiche | |
| 2008/0167123 A1 | 7/2008 | Luciano, Jr. | |
| 2008/0231611 A1 | 9/2008 | Bathiche | |

OTHER PUBLICATIONS

Wangsiripitak, Somkiat, *Cursor Position Estimation Model for Virtual Touch Screen Using Camera*, PWASET vol. 5, WASET.ORG (2005).

\* cited by examiner

*Primary Examiner* — Brandon Hoffman
(74) *Attorney, Agent, or Firm* — Farjami & Farjami LLP

(57) ABSTRACT

There is presented a system for determining a placement of a virtual object in a performance space according to a performance by a real-time performer. The disclosed system comprises a projection module including a polarizing filter, the projection module configured to generate a polarized visible image corresponding to the virtual object. The system includes a surface for displaying the polarized visible image to the real-time performer. The system also includes a detection module for detecting inputs to the surface, wherein the inputs are provided by the real-time performer based on a location of the polarized visible image on the surface. The system further comprises a mapping module configured for mapping a location of each input to the surface to a corresponding point in the performance space, for the placement of the virtual object in the performance space according to the locations of inputs to the surface by the real-time performer.

18 Claims, 4 Drawing Sheets

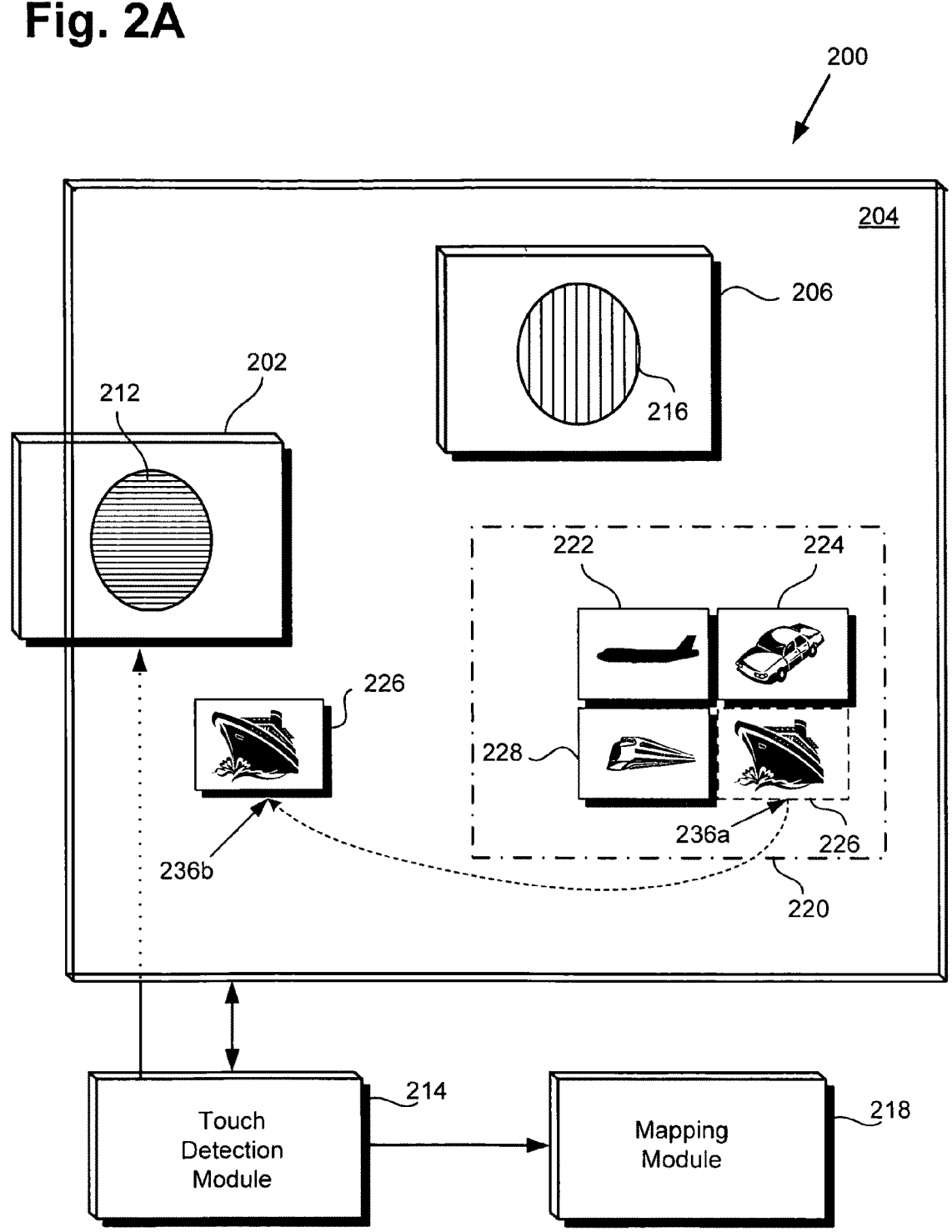

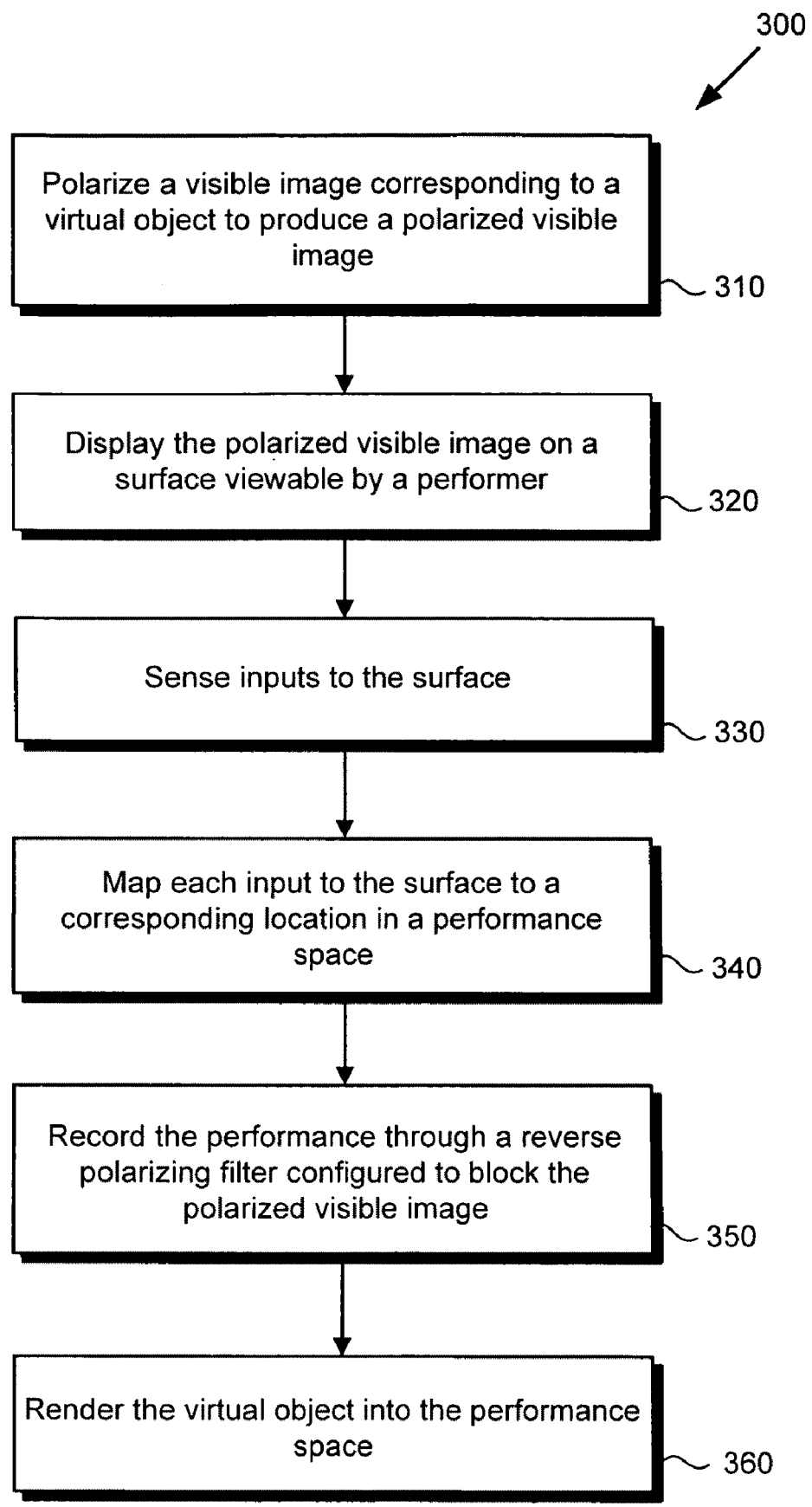

SYSTEM AND METHOD FOR DETERMINING PLACEMENT OF A VIRTUAL OBJECT ACCORDING TO A REAL-TIME PERFORMANCE

BACKGROUND OF THE INVENTION

1. Field of the Invention

The present invention is generally in the field of videography. More particularly, the present invention is in the field of special effects and virtual reality.

2. Background Art

Videography is an effective medium for delivering evocative and stimulating viewing content to a wide audience. Inevitably, however, even as powerful a content delivery technique as videography is constrained by the practical limitations imposed by its own requirements for recording equipment, appropriate lighting, and other environmental controls. As a result, some scenes that a videographer may envision and wish to incorporate into a presentation, might, because of these practical limitations, never be given full artistic embodiment. Consequently, some aesthetically desirable elements of a video presentation may have to be omitted entirely, or when included, be provided in a less than optimally pleasing or realistic manner.

As specific examples of video presentations that may be shaped by their environment, television travel and leisure programs can be heavily reliant on the technical resources of a studio set to support and assure their production standards. A studio set often provides optimal lighting, audio transmission, sound effects, announcer cueing, screen overlays, and production crew support, in addition to other technical advantages. The studio set, however, typically provides a relatively fixed spatial format and therefore may not be able to accommodate especially large, numerous, or dynamically interactive objects without significant modification, making the filming of those objects in studio, costly or perhaps entirely impracticable.

One conventional approach to including video footage of very large, cumbersome, or moving objects in studio set based video productions is to videotape those logistically challenging objects on location, as an alternative to filming them in studio. For example, large or moving objects may be shot remotely, and integrated with a studio based presentation accompanied by commentary from and perhaps simulated interaction by a real-time performer present in studio, such as an anchor or analyst. Unfortunately, this conventional solution requires sacrifice of some of the technical advantages that the studio setting provides, while imposing the sometimes significant production costs flowing from the transport and support of personnel and equipment in the field to provide the remote filming. Furthermore, effective filming of large or cumbersome objects on location may still remain problematic because their unwieldiness may make it difficult for them to be moved smoothly or to be readily manipulated to provide an optimal viewer perspective.

Another conventional approach to compensating for the limitations imposed by studio-based video productions makes use of general advances in computing and processing power, which have made rendering virtual objects a realistic alternative to filming live objects that are difficult or expensive to capture. Although this alternative may help control production costs, there are also drawbacks associated with conventional approaches to rendering virtual objects. One significant drawback is that the virtual objects rendered according to conventional approaches are typically unseen by the real-time performers in studio. Consequently, there is likely to be a sizeable reality gap for a viewer of the presentation when the virtual object is combined with footage of the real-time performer in action.

Accordingly, there is a need to overcome the drawbacks and deficiencies in the art by providing a solution for determining placement of a virtual object according to a performance by a real-time performer, such that a viewer is presented with a pleasing and convincing simulation of real-time or imagined events.

SUMMARY OF THE INVENTION

There are provided systems and methods for determining placement of a virtual object according to a real-time performance, substantially as shown in and/or described in connection with at least one of the figures, as set forth more completely in the claims.

BRIEF DESCRIPTION OF THE DRAWINGS

The features and advantages of the present invention will become more readily apparent to those ordinarily skilled in the art after reviewing the following detailed description and accompanying drawings, wherein:

FIG. 2A shows operation of the system of FIG. 1 from the perspective of the real-time performer delivering the performance, according to one embodiment of the present invention;

FIG. 3 is a flowchart presenting a method for determining placement of a virtual object according to a performance by a real-time performer, according to one embodiment of the present invention.

DETAILED DESCRIPTION OF THE INVENTION

Figure 1:
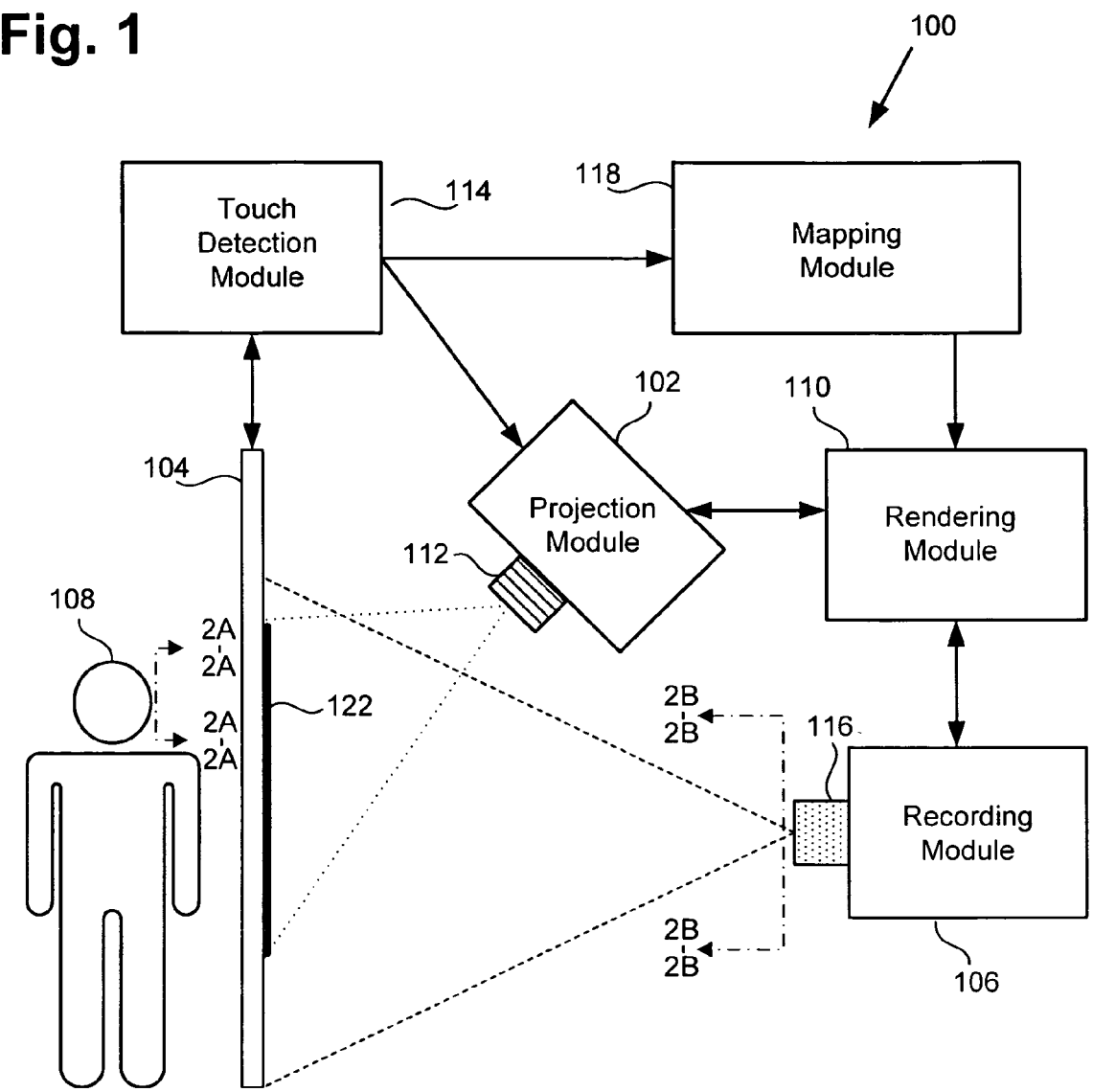
FIG. 1 shows a block diagram of a system for determining placement of a virtual object according to a performance by a real-time performer, according to one embodiment of the present invention.

The present application is directed to a system and method for determining placement of a virtual object according to a performance by a real-time performer. The following description contains specific information pertaining to the implementation of the present invention. One skilled in the art will recognize that the present invention may be implemented in a manner different from that specifically discussed in the present application. Moreover, some of the specific details of the invention are not discussed in order not to obscure the invention. The specific details not described in the present application are within the knowledge of a person of ordinary skill in the art. The drawings in the present application and their accompanying detailed description are directed to merely exemplary embodiments of the invention. To maintain brevity, other embodiments of the invention, which use the principles of the present invention, are not specifically described in the present application and are not specifically illustrated by the present drawings. It should be borne in mind that, unless noted otherwise, like or corresponding elements among the figures may be indicated by like or corresponding reference numerals.

The present inventors recognize the drawbacks and deficiencies of conventional solutions for coordinating interaction between a real-time performer and a virtual object unseen by the real-time performer. Moreover, the present inventors have succeeded in overcoming those disadvantages by providing a system and method for synchronizing the placement of a virtual object in a performance space with the actions of a real-time performer delivering the performance, so as to enhance the realism of such a performance. FIG. 1 shows a block diagram of system 100 for determining placement of a virtual object according to a performance by a real-time performer, according to one embodiment of the present invention. In the embodiment of FIG. 1, system 100 comprises projection module 102 including polarizing filter 112, surface 104 on which is displayed polarized visible image 122, touch detection module 114, and mapping module 118. Also shown in FIG. 1 are real-time performer 108, recording module 106 including reverse polarizing filter 116, and rendering module 110.

According to the embodiment of FIG. 1, projection module 102 may be configured to utilize polarizing filter 112 to generate polarized visible image 122 corresponding to the virtual object. Surface 104 is shown by FIG. 1 to be situated so as to be display polarized visible image 122 and be viewable by real-time performer 108. As further shown by FIG. 1, touch detection module 114 is coupled to surface 104, in order to detect inputs or sense touches to surface 104, for example. Touch detection module 114 is also coupled to projection module 102 and mapping module 118, and provides those system elements with touch detection data.

Mapping module 118 may be configured to identify a point or points in a performance corresponding to the locations of touches to surface 104. The performance space is a virtual space corresponding to the physical space in which performer 108 delivers his or her performance. For example, mapping module 118 may be configured to correlate the location of a touch on the two dimensional space of surface 104 to a unique point or locus of points in a performance space replicating the three-dimensional physical space of a television studio. As a result, system 100 comprising projection module 102 including polarizing filter 112, surface 104, touch detection module 114, and mapping module 118 may be utilized to determine placement, and even movement, of a virtual object in the performance space corresponding to the performance of real-time performer 108, according to the locations of touches to surface 104 by real-time performer 108.

In FIG. 1, recording module 106 is shown to be positioned to record a performance of real-time performer 108 through surface 104. Recording module 106 includes reverse polarizing filter 116, which may be configured to block polarized visible image 122 generated by projection module 102 and displayed on surface 104. In addition, the embodiment of FIG. 1 shows each of projection module 102, recording module 106, and mapping module 118 to be coupled to rendering module 110. That representation is merely for the purposes of example, however, and in other embodiments, recording module 106 and rendering module 110 may not be present in system 100. In embodiments in which system 100 includes recording module 106 including reverse polarizing filter 116, the system may be configured to produce a recorded performance by the real-time performer. Alternatively, In embodiments in which system 100 includes rendering module 110, the system may be configured to render the virtual object into the performance space of real-time performer 108. Moreover, in embodiments in which both recording module 102 and rendering module 110 are present, as shown in FIG. 1, rendering module 110 may be configured to render the virtual object into the recorded performance.

For example, in one embodiment, system 100 may be implemented in a television studio to simulate interaction of a human host of a travel or leisure program with a virtual object comprising a virtual destination environment or corresponding to a mode of transportation. In that embodiment, system 100 may be configured to determine placement of the virtual object in the performance of real-time performer 108, e.g., it's apparent distance from and spatial orientation relative to real-time performer 108. More specifically, projection module 102 including polarizing filter 112 may be configured to project polarized visible image 122 corresponding to the virtual object for display on surface 104. In some embodiments, the virtual object may comprise a moving image of a train or cruise ship moving in a background behind real-time performer 108, e.g., the travel host, for example. Moreover, in those embodiments, projection module 102 may be configured to utilize polarizing filter 112 to simulate movement of the virtual object, e.g., train or cruise ship, through corresponding movement of polarized visible image 122 displayed on surface 104. Polarized visible image 122 corresponding to the virtual object may comprise a graphical image, such as a pictorial representation of the train or cruise ship, or a dynamic image such as a video clip of the train or cruise ship in operation.

Polarized visible image 122 viewable by real-time performer 108 on surface 104 may be used to cue the performance of real-time performer 108. In addition, inputs supplied to surface 104 by real-time performer 108 may be communicated to mapping module 118 for processing. For example, as indicated by FIG. 1, touch detection module may be configured to sense touches to surface 104 by real-time performer 108. Touch detection may be performed by any of several different methods, as known in the art. For instance, one or more cameras or sensors may be used to detect interaction of real-time performer 108 with surface 104, and to identify the location of touches to surface 104 by real-time performer 108. Furthermore, touch detection module 114 corresponds more generally to any suitable detection module for sensing or detecting inputs to surface 104 by real-time performer 108. Mapping module 118 can then be used to map the location of touches, or other inputs, to surface 104 to a performance space, by determining corresponding points in the performance space, which may comprise a virtual three-dimensional model of the studio space in which real-time performer 108 is delivering his or her performance.

As a result of the one or more inputs provided by real-time performer 108 to surface 104, and the determination of corresponding one or more points in the performance space by mapping module 118, placement of the virtual object to which polarized visible image 122 corresponds may be synchronized with the actions of real-time performer 108. It is noted that although the present application describes the performance space in terms of a television studio set, in other embodiments, the performance space may replicate another type of contained space, such as a sporting arena, for example. Alternatively, the performance space may be defined within a physically unbounded outdoor space. Thus, a performance space may comprise a virtual space corresponding to any physical space in which real-time performer 108 delivers his or her performance, so long as the dimensions of the physical space and/or the position of real-time performer 108 within the physical space can be defined.

Figure 2B:
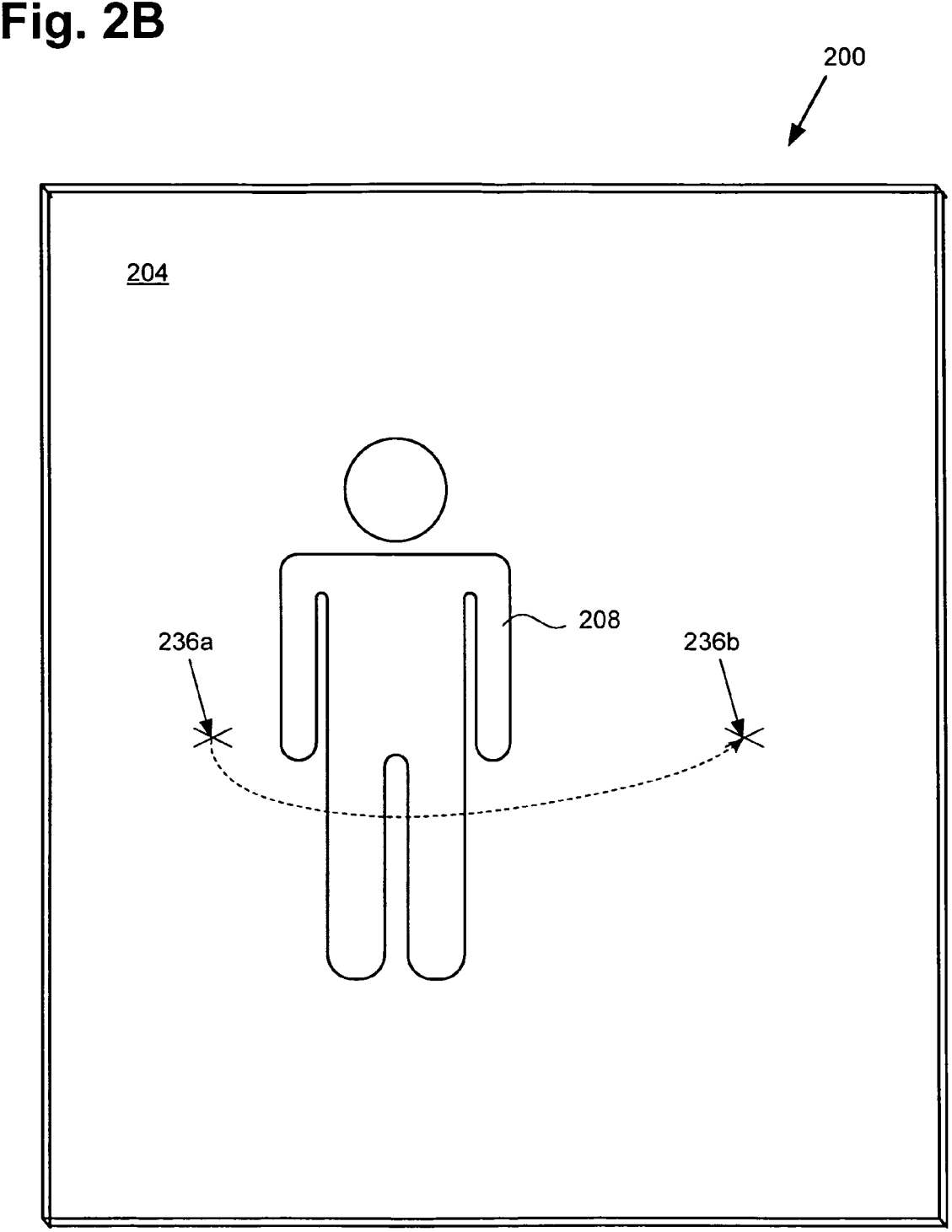
FIG. 2B shows operation of the system of FIG. 1 from the perspective of a recording module for the performance, according to one embodiment of the present invention.

The various features and advantages of system 100 will now be further described by reference to FIGS. 2A and 2B. FIG. 2A shows operation of a system corresponding to system 100, in FIG. 1, from the perspective of real-time performer 108 along arrows 2A-2A in that figure, according to one embodiment of the present invention. FIG. 2B shows operation of the same system from the perspective of recording module 106 along arrows 2B-2B in FIG. 1, according to one embodiment of the present invention.

Referring first to FIG. 2A, FIG. 2A shows system 200 from the perspective of a real-time performer (not shown in FIG. 2A). System 200, in FIG. 2, corresponds to system 100, in FIG. 1, viewed from the perspective of real-time performer 108. As shown in FIG. 2A, system 200 comprises projection module 202 including polarizing filter 212, surface 204, touch detection module 214, and mapping module 218. Also included in FIG. 2A are recording module 206 including reverse polarizing filter 216, and polarized projection 220 comprising polarized visible images 222, 224, 226, and 228. It is noted that polarized visible image 226 is shown twice in FIG. 2A, corresponding to polarized visible image 226 respectively before and after movement from location 236a to location 236b on surface 204.

Projection module 202 including polarizing filter 212, surface 204 on which is displayed polarized visible images 222, 224, 226 and 228, touch detection module 214, mapping module 218, and recording module 206 including reverse polarizing filter 216, in FIG. 2A, correspond respectively to projection module 102 including polarizing filter 112, surface 104 on which is displayed polarized visible image 122, touch detection module 114, mapping module 118, and recording module 106 including reverse polarizing filter 116, in FIG. 1. It is noted that rendering module 110, in FIG. 1, is not represented in FIG. 2A. As previously explained, in some embodiments of the present invention, a system for determining placement of a virtual object according to a performance by a real-time performer may not include one or both of recording module 206 and a rendering module corresponding to rendering module 110, in FIG. 1.

As shown by FIG. 2A, in the embodiment of system 200 projection module 202 utilizes polarizing filter 212 to generate polarized projection including polarized visible images 222, 224, 226, and 228 on surface 204. Continuing with the example introduced during the discussion of FIG. 1, let us assume that system 200 is implemented in a television studio to simulate interaction of a human host of a travel or leisure program with a virtual object corresponding to a mode of transportation. In the present example, polarized projection 220 includes individual polarized visible images 222, 224, 226, and 228, enabling the human host, i.e., real-time performer, to select on or more of the polarized visible images for interaction. In some embodiments, the virtual objects to which polarized visible images 222, 224, 226, and 228 correspond may be virtual environments for the performance, such as a virtual cruise ship terminal or an observation deck of a cruise ship when polarized visible image 226 is selected by the real-time performer.

As shown in FIG. 2A, system 200 may be configured to generate multiple polarized visible images for display on surface 204, e.g., polarized visible images 222, 224, 226, and 228. Moreover, those multiple polarized visible images may be shown concurrently, sequentially, or in a combination of those presentation modes, for example. For instance, polarized projection 220 including polarized visible images 222, 224, 226, and 228 may be generated first by projection module 202 and displayed on surface 204. Because surface 204 displaying polarized projection 220 is viewable by the program host, the host may select one of polarized visible image 222, 224, 226, or 228 for interaction during the performance, for example by simulating dragging polarized visible image 226 from location 236a on surface 204 to location 236b on surface 204. That action by the host may be sensed by touch detection module 214, and communicated to projection module 202 and mapping module 218. As a result, projection module 202 may be configured to move polarized visible image 226 to location 236b. In addition, mapping module 218 may be configured to identify a point in the performance space corresponding to location 236b. That operation by mapping module 218 enables synchronizing placement of the virtual object corresponding to polarized visible image 226 with the real-time action of the program host.

Moving now to FIG. 2B while continuing to refer to FIG. 2A, FIG. 2B shows system 200 from the perspective of recording module 206, in FIG. 2A. System 200 includes surface 204, which in the present example is shown to be a substantially transparent panel situated between real-time performer 208 and recording module 206. It is noteworthy that FIG. 2B does not show polarized projection 220 including polarized visible images 222, 224, 226, and 228, which is currently viewable on surface 204 by real-time performer 208, as shown by FIG. 2A. As may be apparent from FIG. 2B, the polarized visible image viewable by real-time performer 208, who in this case is a human performer, is not visible to recording module 206. This may be understood in light of the fact that recording module 206 is viewing surface 204 through reverse polarizing filter 216, which, as shown, is configured to block polarized visible images 222, 224, 226, and 228. Thus, rather than viewing the polarized visible images generated by projection module 202, recording module 206 merely sees the performance of real-time performer 208, including his or her interaction with surface 204 at locations 236a and 236b.

Some of the advantages accruing from the present invention may be recognized from the embodiment shown in FIGS. 2A and 2B. For example, by projecting a polarized visible image corresponding to a virtual object onto surface 204 viewable by real-time performer 208, and then sensing one or more inputs to surface 204 by real-time performer 208 in response to those images, the present system gathers data enabling mapping module 218 to determine placement of a virtual object corresponding to the polarized visible image according to the inputs by real-time performer 208. In addition, in embodiments of the present system comprising recording module 106 including reverse polarizing filter 216, blocking of the polarized visible image by reverse polarizing filter 216 allows the cues provided to the real-time performer to remain substantially transparent to a viewer of the recorded performance.

As an additional example of the functionality of system 200, let us assume that the real-time performer is a human host of a studio based basketball sports segment. According to the present embodiment, the performance space may comprise the physical dimensions of the studio set. Instead of the specific polarized visible images shown in FIG. 2A, e.g., polarized visible images 222, 224, 226, and 228, the polarized visible images displayed on surface 204 might correspond to four members of a local basketball team. The host, e.g. real-time performer 208, acting as the fifth member of the basketball team, can utilize system 200 to place virtual representations of the four basketball team members in the studio.

For instance, surface 204 may display polarized visible images of boundary lines defining upper and lower, and left and right quadrants (quadrants not shown in FIGS. 2A and 2B). The upper left quadrant of surface 204 might correspond to a portion of the studio between the host and recording module 206 and to the left hand side of the host, while the lower left quadrant of surface 204 might correspond to a portion of the studio behind and to the left hand side of the host. Similarly the upper and lower right hand quadrants might correspond to portions of the studio to the right of the host and situated respectively in front of and behind the host.

Inputs provided by the host, such as dragging and dropping the polarized visible images corresponding to the respective team members to desired locations on surface 204, enables mapping module 218 to identify the placement of each team member in the performance space.

Although surface 204 is shown as a substantially planar surface, in some embodiments surface 204 may partially surround real-time performer 208. Referring to FIG. 1, in one such embodiment, for example, a surface might comprise planar surface segment 104 substantially perpendicular to the perspective shown by arrows 2A-2A, and also a segment substantially parallel to arrows 2A-2A. In that embodiment, lateral placement of virtual objects in the performance space might be mapped by mapping module 118 according to their location on surface 104. The respective depths of the virtual objects within the three dimensional performance space could be mapped according to inputs provided by real-time performer 108 indicating respective distance along the parallel surface segment from surface 104.

Moreover, where some or all of surface 104 comprises a substantially transparent panel situated between real-time performer 108 and recording module 106, surface 104 becomes in effect a head-up display for real-time performer 108. As a result, in those embodiments, real-time performer 108 may receive visible cues to his or her real-time performance without looking away from, or perhaps even breaking eye contact with, recording module 106. Furthermore, in embodiments including rendering module 110, the one or more virtual objects may be subsequently rendered into the recorded performance. Consequently the presently disclosed systems are capable of producing a recorded performance that synchronizes placement of one or more virtual objects with the actions of the real-time performer in a pleasingly realistic manner, while preserving engagement between the real-time performer and a viewing audience of the recorded performance.

Turning now to FIG. 3, FIG. 3 shows a flowchart of a method for determining placement of a virtual object according to a performance by a real-time performer. The steps shown in flowchart 300 are provided merely as examples, however, and any step may consist of one or more substeps or may involve specialized equipment or materials, as known in the art. While steps 310 through 360 indicated in flowchart 300 are sufficient to describe one embodiment of the present method, other embodiments may utilize steps different from those shown in flowchart 300, or may include more, or fewer steps.

Starting with step 310 in FIG. 3 and referring to FIG. 2A, step 310 of flowchart 300 comprises polarizing a visible image corresponding to a virtual object to produce a polarized visible image, such as one of polarized visible images 222, 224, 226, or 228. Step 310 may be performed by projection module 202 using polarizing filter 212, for example. As previously explained, polarized visible image, e.g., polarized visible image 226, may be a still graphical image such as a pictorial representation of the virtual object, or a dynamic image such as a video clip, for example. In some embodiments, moreover, polarized visible image 226 may correspond to a moving virtual object, or comprise a virtual environment for the performance of the real-time performer.

Continuing with step 320 of flowchart 300 and referring to FIGS. 2A and 2B, step 320 comprises displaying polarized visible image 226 on surface 204 viewable by real-time performer 208. In the embodiment of system 200, step 320 may be performed by projection module 202 including polarizing filter 212, in combination with surface 204.

Step 330 of flowchart 300 comprises detecting inputs to surface 204 by real-time performer 208. Detection may be based on a location of a polarized visible image on surface 104. For example, as shown in FIG. 2A, in some embodiments detecting inputs to surface 204 in step 330 may comprise detecting touches to surface 204 by real-time performer 208 arranging or rearranging polarized visible images 222, and/or 224, and/or 226, and or 228 on surface 204. Step 330 may be performed by touch detection module 214, for example, in combination with surface 204.

Moving to step 340 of flowchart 300, step 340 comprises mapping a location of each input to surface 204 to a corresponding point in a performance space. As shown in FIG. 2A, step 340 may be performed by mapping module 218 according to data provided by touch detection module 214, for example. As previously explained, the performance space is a virtual space corresponding to the physical space in which real-time performer 208 delivers his or her performance, such as a television studio set. As a result of the described steps, the present method enables determining placement of a virtual object in the performance space according to locations of inputs to surface 204 by real-time performer 208.

Continuing with step 350 of flowchart 300, in embodiments of system 200 comprising recording module 206 including reverse polarizing filter 216, step 350 comprises recording the performance by real-time performer 208 through reverse polarizing filter 216 configured to block polarized visible image 226. Step 350 may be performed by recording module 206, and results in the performance cueing represented by polarized visible image 226 remaining substantially invisible or transparent to a viewer of the recorded performance, which is further described in U.S. patent application Ser. No. 12/383,557, filed Mar. 24 2009, titled "System and Method for Synchronizing a Real-Time Performance with a Virtual Object" which is herein incorporated by reference in its entirety.

As shown by step 360 of flowchart 300, in some embodiments the present method may further include a step of rendering the virtual object into the performance space. Referring to FIG. 1, step 360 may be performed by rendering module 110, which receives mapping information for synchronizing placement of the virtual object with the performance of real-time performer 108.

Thus, a system and method for determining placement of a virtual object according to a performance by a real-time performer has been described. From the above description of the invention it is manifest that various techniques can be used for implementing the concepts of the present invention without departing from its scope. Moreover, while the invention has been described with specific reference to certain embodiments, a person of ordinary skill in the art would recognize that changes can be made in form and detail without departing from the spirit and the scope of the invention. It should also be understood that the invention is not limited to the particular embodiments described herein, but is capable of many rearrangements, modifications, and substitutions without departing from the scope of the invention.

What is claimed is:

1. A system for determining a placement of a virtual object in a performance space according to a performance by a real-time performer, the system comprising:
   a projection module including a polarizing filter, the projection module configured to generate a polarized visible image corresponding to the virtual object;
   a surface for displaying the polarized visible image, the surface viewable by the real-time performer;

a detection module for detecting touch inputs to the surface, wherein the touch inputs are provided by the real-time performer based on a location of the polarized visible image on the surface; and a mapping module configured for mapping a location of each of the touch inputs to the surface to a corresponding point in the performance space, for the placement of the virtual object in the performance space according to the locations of the touch inputs to the surface by the real-time performer;

a reverse-polarizing filter, the reverse-polarizing filter configured to reverse-polarize images of the performance by the real-time performer and the polarized visible image displayed on the surface to produce reverse-polarized images; and wherein the reverse-polarizing filter is further configured to block the polarized visible image from a viewer of the performance.

2. The system of claim 1, further comprising a recording module including the reverse-polarizing filter, wherein the recording module is configured to record the reverse-polarized images.

3. The system of claim 2, wherein the surface comprises a transparent panel situated between the real-time performer and the recording module.

4. The system of claim 1, wherein the real-time performer is a human performer.

5. The system of claim 1, wherein the virtual object comprises a moving object.

6. The system of claim 1, wherein the virtual object comprises a virtual environment for the performance.

7. The system of claim 1, wherein the polarized visible image comprises a graphical image.

8. The system of claim 1, wherein the polarized visible image comprises a video clip.

9. The system of claim 1, further comprising a rendering module configured to render the virtual object into the performance space according to the locations of the touch inputs to the surface by the real-time performer that are provided by the mapping module.

10. A method for determining a placement of a virtual object in a performance space according to a performance by a real-time performer, the method comprising:

polarizing a visible image corresponding to the virtual object to produce a polarized visible image;

displaying the polarized visible image on a surface viewable by the real-time performer;

detecting touch inputs to the surface, wherein the touch inputs are provided by the real-time performer based on a location of the polarized visible image on the surface; and mapping a location of each of the touch inputs to the surface to a corresponding point in the performance space, for the placement of the virtual object in the performance space according to the locations of the touch inputs to the surface by the real-time performer;

reverse-polarizing images of the performance by the real-time performer and the polarized visible image displayed on the surface to produce reverse-polarized images, wherein the reverse-polarized images block the polarized visible image from a viewer of the performance.

11. The method of claim 10, further comprising:
recording the reverse-polarized images.

12. The method of claim 11, wherein the surface comprises a transparent panel situated between the real-time performer and a recording module configured to do the recording.

13. The method of claim 10, wherein the real-time performer is a human performer.

14. The method of claim 10, wherein the virtual object comprises a moving object.

15. The method of claim 10, wherein the virtual object comprises a virtual environment corresponding to the performance space.

16. The method of claim 10, wherein the polarized visible image comprises a graphical image.

17. The method of claim 10, wherein the polarized visible image comprises a video clip.

18. The method of claim 10, further comprising rendering the virtual object into the performance space according to the locations of the touch inputs to the surface by the real-time performer that are provided by the mapping.

* * * * *